Patented Nov. 23, 1926.

1,608,317

UNITED STATES PATENT OFFICE.

AUGUSTUS CHARLES HYDE, OF PERIVALE, ENGLAND.

THERMIONIC VALVE.

No Drawing. Application filed May 26, 1925, Serial No. 33,049, and in Great Britain June 20, 1924.

My invention relates to improvements in the manufacture of cathodes in thermionic valves, which cathodes are usually in the form of filaments, and has for its object to provide cathodes for such valves which are more durable than hitherto and while requiring a lower temperature than that usually employed, increase the power of emission of electrons from the cathode when in use.

Attempts have been made to obtain cathodes having these advantages by coating them externally with various radio active materials such as thoria, erbia, lime and such like bodies but the attempts have proved unsatisfactory hitherto owing to the difficulty of ensuring adhesion between the coating and the body of the cathode which usually consisted of tungsten. Another method of introducing these radio active bodies into the cathode was to mix small quantities of thoria or other like agent with powdered tungsten prior to the compression of the tungsten into a bar from which it was subsequently hammered into rod form. But with this method only very small quantities of thoria could be introduced into the tungsten because larger quantities impaired the mechanical properties of the tungsten and rendered it unsuitable to be hammered and drawn out into fine filaments or wires.

It has also been proposed to employ a core of platinum or other noble metal and to coat this core with substances usually deemed thermionically active such as compounds of metals of the alkaline earth group such as calcium, barium, and strontium applied as a paste to the platinum core which after drying was heated in the air so as to effect a mechanical binding of the coating to the filament.

According to my invention a core of tungsten or of molybdenum (known as refractory metals) is coated with a strongly adherent coating or covering of thorium or uranium metal whereby after the treatment hereinafter described I obtain a cathode possessing great powers of emission of electrons. The coating is effected by applying to the surface of the core a mixture prepared from a colloidal solution of tungstic acid and finely powdered thorium or uranium and then warming the coated core so as to cause the coating to dry and adhere to the core. In order to render the coating still more adherent I heat the coated core up to a temperature approximately within the range of 1700 degrees centigrade to 2000 degrees centigrade in a vacuum or in a reducing or inert gas so that the coating or covering produced is initially free from oxide of thorium or of uranium and does not chemically act on the core. This second heating effects a reduction of the adhesive agent to the metallic form and leaves a coating of metallic tungsten and thorium or metallic tungsten and uranium.

Instead of a solution of tungstic acid I may use a solution of platinum (by which phrase I mean either platinum in a colloidal form or one of the salts of platinum) or of one of the group of platinum metals capable of being reduced to metal by heating either in the air or in a reducing or inert gas. The platinum solution employed is preferably one in which the platinum salt is dissolved in a volatile organic solvent containing some adhesive body such as bitumen, gum or the like and to which is added a suitable quantity of very finely powdered thorium or uranium metal. After the mixture has been prepared the core to be coated is drawn through the same thereby giving the core a coating or covering of the platinum thorium or uranium mixture which owing to the volatile nature of the solvent after warming or by sufficient exposure to the air becomes hard and adherent. The thickness of the coating may be increased by repeated passages of the core through the mixture with a separate thorough drying after each passage. The core thus coated is then heated in vacuo, or in hydrogen or an inert gas up to a temperature approximately within the range of 1700 degrees centigrade to 2000 degrees centigrade according to the nature of the core. After baking at this high temperature the coated core is ready for mounting as a cathode in a thermionic valve.

The action of the platinum when used in the process according to my invention is that of an intermediary metal between the core and the coating which during the heating becomes melted so attaching the thorium or uranium metal coating or covering to the inner core by a welding or soldering process which heating must be performed as aforesaid in a vacuum, or reducing or inert atmosphere to prevent the metal being oxidized and becoming a salt of thorium or uranium.

What I claim is:—

1. In the manufacture of cathodes in thermionic valves, the step of coating a core of refractory metal with a finely powdered body having the property of emitting electrons when heated, by applying a solution of tungstic acid mixed with said finely powdered body, and then heating the coated core.

2. In the manufacture of cathodes in thermionic valves, the step of coating a core of refractory metal by applying to the core a solution of tungstic acid mixed with finely powdered thorium, and then heating the coated core.

3. In the manufacture of cathodes in thermionic valves, the step of coating a core of refractory metal with a finely powdered body having the property of emitting electrons when heated by applying a solution of tungstic acid mixed with said finely powdered body, then warming the coated core to obtain adhesion of the coating to the core, and finally heating the coated core in a non-oxidizing gas to a temperature within the range of 1700° to 2000° centigrade.

4. In the manufacture of cathodes in thermionic valves, the step of coating a core of refractory metal by applying a solution of tungstic acid mixed with finely powdered thorium, then warming the coated core to obtain adhesion of the coating to the core, and finally heating the coated core in a non-oxidizing gas to a temperature within the range of 1700° to 2000° centigrade.

In testimony whereof I have signed my name to this specification.

AUGUSTUS CHARLES HYDE.